United States Patent [19]

Yats et al.

[11] Patent Number: 4,654,100

[45] Date of Patent: Mar. 31, 1987

[54] METHOD FOR PREPARING RANDOM-FIBER THERMOSET COMPOSITES

[75] Inventors: Larry D. Yats, Clare; Ritchie A. Wessling, Midland, both of Mich.

[73] Assignee: The Dow Chemical Company, Midland, Mich.

[21] Appl. No.: 708,199

[22] Filed: Mar. 4, 1985

[51] Int. Cl.$^4$ .................. B27N 3/00; B32B 31/00; D21D 3/00; C08K 3/40
[52] U.S. Cl. .................. 156/246; 156/62.2; 156/296; 162/156; 162/164.3; 523/400; 523/424; 523/439; 523/444; 523/527; 524/494; 524/594
[58] Field of Search .......... 523/400, 424, 439, 444, 523/527; 156/62.2, 246, 296; 162/156, 164.3

[56] References Cited

U.S. PATENT DOCUMENTS

| | | | |
|---|---|---|---|
| 4,056,501 | 11/1977 | Gibbs et al. | 525/76 |
| 4,295,907 | 10/1981 | Cordts et al. | 156/246 |
| 4,426,470 | 1/1984 | Wessling et al. | 162/156 |
| 4,431,696 | 2/1984 | Drusco et al. | 162/157.5 |
| 4,518,653 | 5/1985 | McWilliams et al. | 156/246 |

FOREIGN PATENT DOCUMENTS

| | | |
|---|---|---|
| 0039292 | 11/1981 | European Pat. Off. . |
| 2507123 | 12/1982 | France . |
| 1263812 | 2/1972 | United Kingdom . |

*Primary Examiner*—Herbert J. Lilling

[57] ABSTRACT

Processes for the preparation of random-fiber thermoset composite sheets by employing a latent curing agent thermoset resin formulation or a coreactant thermoset system such that uncured thermoset composite sheets are formed which can be subsequently formed and cured into articles of manufacture.

12 Claims, No Drawings

METHOD FOR PREPARING RANDOM-FIBER THERMOSET COMPOSITES

BACKGROUND OF THE INVENTION

This invention is directed toward the preparation of random-fiber thermoset composites. Generally, the composites are prepared by a wet-laid aqueous technique characterized by steps for incorporating a thermoset resin.

Typically, reinforced thermoset materials have been made by hand lay-up methods where the reinforcement is saturated with resin, or resin and solvent and then allowed to dry. The resin saturated material is then arranged into varying shapes as desired and pressed at elevated temperatures to densify and cure the material.

It is desirable to form reinforced thermoset materials in a more efficient manner. A solution is to employ a wet-laid aqueous technique such as employed in the formation of polymeric composites. The preparation of reinforced polymeric composites is disclosed in U.S. Pat. Nos. 4,426,470 and 4,431,696. Additionally, foreign patents disclose the wet-laid aqueous procedures modified to produce polymeric composites. Such patents include U.K. Pat. No. 1,263,812; French Patent Publication No. 2,507,123 and European Patent Office Publication No. 0,039,292-Al.

Problems associated with the wet-laid technique for forming a random-fiber thermoset composite are that steps must be taken to produce a sheet which can be subsequently shaped and/or thermoformed. It is understood that a thermoset is a cured plastic material which is irreversibly hardened by crosslinking whereas thermoplastics can be formed and reformed by the application of heat. Therefore in the preparation of a thermoset composite it is necessary to take steps to prevent the wet mat collected from the aqueous slurry from becoming a rigid thermoset solid prior to fabrication.

The subject methods for forming a random-fiber thermoset composite consider these problems and provide for the preparation of a thermoset composite sheet which can be prepared and fashioned into useful articles of manufacture.

SUMMARY OF THE INVENTION

The present invention provides a process for preparing a random-fiber thermoset composite comprising the steps of
 (a) preparing an aqueous slurry comprising
  (i) a reinforcing material,
  (ii) binder, and
  (iii) a thermoset resin formulation comprising a solid thermoset resin(s) and a latent curing agent, or a solid thermoset resin portion of a coreactant thermoset system containing a solid and liquid or gaseous component;
 (b) destabilizing and dewatering the aqueous slurry;
 (c) collecting the solids in the form of a mat;
 (d) drying the mat under conditions such that said thermoset formulation remains in a heat formable state, forming the mat into a predetermined shape and, where the thermoset resin formulation is said coreactant thermoset system, saturating the mat with the liquid or gaseous component of said coreactant thermoset system; and
 (e) curing the mat.

The present invention provides that in one aspect the thermoset resin remains heat formable prior to formation into a predetermined shape, step (d), by employing a latent curing agent in the thermoset resin formulation.

In yet another aspect, the thermoset resin remains heat formable prior to formation into a predetermined shape, step (d), by employing a coreactant thermoset system where in step (a) the solid coreactant portion is added and the process includes the additional step of saturating the mat prepared in step (d) with a liquid or gaseous coreactant portion of the coreactant thermoset system whereby the thermoset can be cured.

Additionally, the mat can be lofted prior to the curing step (e). Lofted is where the density of the mat is lowered and thus the dimensions of the mat are increased.

The present invention provides for processes by which random-fiber thermoset composite sheets can be prepared without curing the thermoset resin such that the sheets can be formed and cured into useful articles of manufacture.

DETAILED DESCRIPTION OF THE INVENTION

The present invention is directed toward the preparation of random-fiber thermoset composites. Generally, the random-fiber thermoset composite is a reinforced sheet prepared in an aueous wet-laid fashion wherein the heat formable polymeric network is a thermoset resin.

The methods of this invention generally employ an aqueous medium, a thermoset resin, a reinforcing material, and a binder. In one aspect, the method is characterized by employing a thermoset resin with a latent curing agent, i.e., one which does not cure the resin until the prepared reinforced sheet is formed. In another aspect, the method is characterized by curing the thermoset sheet after saturating said sheet with a liquid or gaseous coreactant portion of the thermoset formulation. For example, a liquid coreactant can be a vinyl polymerizable monomer such as styrene. A gaseous coreactant can be ammonia wherein the mat is wet and thus an ammonium hydroxide base will be formed to cure an epoxy type resin or the gaseous coreactant can be phosgene.

In the subject methods a dilute aqueous slurry is prepared comprising the thermoset resin, reinforcing material, binder and other optional ingredients such as polymeric paste or fibers, colorants, antioxidants, etc. Typically, the reinforcing material is dispersed in the aqueous medium and then the binder is added. To this slurry is added and uniformily dispersed a solid thermoset resin usually in the form of a powder which may be present in an aqueous dispersion. The resulting mixture is then destabilized. Generally, this can be accomplished by using a polymeric flocculant. The destabilized slurry is dewatered and the solids collected on an aqueous wet-laid apparatus such as a sheet mold or other continuous wet-laid equipment and the wet mat is dried under conditions (heat, pressure, radiation) such that the thermoset resin remains heat formable and; therefore, is not totally cured. Drying of the sheet may be either drying at ambient conditions or oven drying. Suitable methods are disclosed in U.S. Pat. No. 4,426,470, herein incorporated by reference. Finally, the dried thermoset sheet can be formed into an article of manufacture and cured to crosslink the thermoset resin. Curing can occur with heat, radiation, or any other means acceptable for the thermoset resins employed.

In one embodiment, a densified mat containing an uncured thermoset resin can be gradually heated to cause a lofting effect in the mat prior to crosslinking the thermoset. That is, as the resin begins to soften the reinforcement material is allowed to relax and, therefore, the mat will become less dense. In some cases, portions of the reinforcement material can actually project from the surface of the mat.

In one method, the prepared sheet characteristically contains a necessary latent curing agent added in the slurry with the thermoset resin formulation. The sheet can then be molded into a desired article and heated to cure the thermoset either separately or simultaneously.

In another aspect, the sheet can be prepared with two solid components of a thermoset resin formulation which do not intimately mix until fusion of the sheet. Thus, one of the two solid components can contain the curing agent.

In another method, a two-step procedure is followed by preparing the sheet with a coreactant thermoset system. The sheet is first prepared with the solid or powdered coreactant portion of the thermoset formulation and then the prepared sheet is saturated with and/or impregnated with the reactive liquid or gaseous coreactant portion of the thermoset formulation. In the two-setp procedure the prepared sheet can be formed after or before saturation and prior to curing, or saturated and molded simultaneously. Optionally, the mat can be densified before saturation and/or impregnation with a liquid coreactant provided the densified mat remained porous enough to absorb the liquid coreactant. The liquid coreactant can then be employed to fill the voids which will cure the mat under curing conditions and eliminate the need for further densification.

The process of the subject invention requires a thermoset resin. Generally thermoset resins are defined for purposes of this invention as a solid polymer at ambient temperatures which upon the addition of hardeners, i.e., curing agents, and/or upon the application of heat cures into a thermoset solid which is not heat formable. Commonly thermosets are described as polymers which will not flow when heated due to their network structure.

The types of thermosets which can be employed in the subject process are limited to those which can be controllably cured. Controllably cured means that the thermoset resin is prevented from completely curing and remains in a heat formable state during the formation of the random fiber composite sheet and; thereafter, is completely cured when formed into a suitable article of manufacture. This control can be provided by choosing an appropriate latent curing system, i.e., curing agents, with respect to the thermoset resin employed and wet-laid processing parameters, i.e., drying temperature, calendering pressure and wet-laid processing temperatures.

In the two-step method the choice of a particular curing agent is not critical. This is due to the composite sheet being first prepared with only one portion of the thermoset formulation whereafter the complement portion of thermoset is added prior to, after, or simultaneously with formation of the sheet into an article of manufacture. Thus, the two-step method can employ condensation reactions such as between solid epoxy resins and liquid curing agents, e.g., polyamines; solid resins having an active hydrogen such as phenolic, carboxylic acids or amino resins with a liquid epoxy or liquid polyisocyanate.

Typical thermoset resins which can be employed are the epoxies, vinylized epoxies, vinyl esters, phenolics, polyesters, phenol formaldehydes, and novolac resins. Preferred thermosets are epoxy, vinyl ester, novolac, and phenolic resins. More preferred are diglycidylether of bisphenol-A type epoxies, epoxy novolac resins and phenol formaldehyde type resins. Other suitable epoxies are disclosed in Lee and Neville, *Handbook of Epoxy Resins*, Chapter 2, McGraw Hill, New York (1967).

Curing agents which can be employed with the subject thermosets are selected from those which are not activated during the preparation, dewatering and drying conditions of the wet-laid composite sheet and; therefore, the curing agents are referred to as latent curing agents. Instead, the curing agent will be activated upon the final molding of the thermoset composite sheet such that desirable articles of manufacture can be prepared.

Generally, the latent curing agents will be activated at temperatures higher than 100° C.; however, where the composite sheet is dried at ambient temperatures the latent curing agent can be chosen such that it is activated at temperatures less than 100° C. but greater than ambient. Preferably, the latent curing agents are activated at temperatures greater than 100° C. Examples of curing agents which are suitable for preparing thermoset composites of the subject invention are free radical initiators such as benzoyl peroxide, aliphatic and aromatic amines or polyamines, polythiols, phenolics, anhydrides, diaminodiphenyl sulfone (DADS), methylenedianiline, and Versamide ®, a trademark of General Mills Chemical, Inc. for reactive polyamide resins. In cases where phenol formaldehyde type resins are employed, the preferred curing agents are urea formaldehyde, melamine formaldehyde or polyamines.

Curing agents and their influence are known in the literature wherein activation temperatures or conditions are readily available. The particular influence of curing agents can be formed in the *Handbook of Epoxy Resins*, (supra) and in *Chemical Reactions of Polymers*, Interscience Publishers, New York, pages 912–926, (1967) as well as other reference works and trade journals.

In addition to the above-mentioned curing agents, accelerators can be employed which are commonly recognized in thermoset formulations provided the use of such accelerators does not cause the thermoset composites to cure prematurely.

The reinforcement materials which are employed in the subject process include both organic and inorganic products such as glass fibers, graphite fibers, metal fibers or metal coated glass or graphite fibers, aromatic polyamide, cellulose and polyolefin fibers. Preferably glass fibers are employed such as chopped glass having a length of about ⅛ to 1 inch (about 3.2 to 25.4 mm) and/or milled glass fibers having a length of about 1/32 to ⅛ inch (about 0.79 to 3.2 mm). Other suitable reinforcement materials are disclosed in U.S. Pat. No. 4,426,470 herein incorporated by reference. The reinforcement material generally comprises from about 10 to about 80 weight percent of the solids, dry weight basis.

The binder component of the subject process is added to the aqueous slurry to aid in binding or adhering the suspended components such that they can be destabilized and collected. Typical binders in wet-laid systems include starches, synthetic polymers and natural polymers. Generally, the polymeric binders are charged to aid in destabilization and in some cases the binder can coreact with the thermoset or be the sole coreactant with the thermoset resin component. Suitable polymeric binders having charges are latex binders which are aqueous colloidal dispersions of substantially water-insoluble organic polymers having anionic or cationic bound charges in an amount sufficient to provide stabilization of the colloid, but insufficient to cause the polymer to be water-soluble. Such an amount of bound charge will usually be from about 0.04 to about 0.60 milliequivalent per gram of polymer solids. The term "bound to the polymer" with respect to ionic groups or charges, refers to ionic groups or charges which are not desorbed from the polymer by dialysis of the latex against deionized water.

By "available" charge is meant the amount of charge an ionizable group would provide to a polymer when fully ionized.

By the term "pH independent groups" as applied to ionic groups is meant that the groups are predominantly in ionized form over a wide range of pH, e.g., 2–12. Representative of such groups are sulfonium, sulfoxonium, isothiouronium pyridinium, quaternary ammonium groups, sulfate and sulfonate groups.

The essentially water-insoluble organic polymers have a backbone which may be natural or synthetic and may be a homopolymer or a copolymer of two or more ethylenically unsaturated monomers or be derived from such homopolymers or copolymers. Representative organic polymers are natural rubber, the synthetic rubbers such as styrene/butadiene rubbers, isoprene rubbers, butyl rubbers and other rubbery or resinous polymers of unsaturated monomers which are film-forming, preferably at room temperature or below, although in a particular instance a polymer may be used which is film-forming at a temperature of processing. Nonfilm-forming polymers may be used in blends providing the resulting blend is film-forming. Polymers which are made film-forming by the use of plasticizers may be used. Polymers which are readily available in latex form are preferred, especially hydrophobic polymers which are prepared by emulsion polymerization of one or more ethylenically unsaturated monomers. When in latex form, such polymers advantageously have a particle size of from 500 to 5000 Å and preferably have a particle size of from 800 to 3000 Å as measured by electron microscopy.

Among latexes which can be used in the present invention are those described in U.S. Pat. No. 4,056,501, issued Nov. 1, 1977, to Gibbs et al., (Gibbs) incorporated herein by reference. The latexes of Gibbs are cationic structured particle latexes consisting of a water-insoluble, nonionic, organic polymer core encapsulated with a thin layer of a copolymer having chemically-bound pH independent cationic groups wherein the bound cationic charges are at or near the outer surface of the particles. Anionic latexes which may be employed are well known in the art and include such products as carboxylated styrene-butadiene latexes and acrylic latexes which are prepared by emulsion polymrization. The binder is generally employed in an amount sufficient to provide from about 1 to about 10 weight percent by weight, solids basis, of the composite.

Preferred latexes are those which when cast into films and dried have a relatively low water adsorption, and a relatively high wet tensile strength. These preferred latexes have a 24 hour water adsorption value of desirably less than about 20, more desirably less than about 18, preferably less than about 16, and more preferably less than about 14 percent as measured by ASTM D-570-63.

The aqueous slurry of the subject process is destabilized in order that the thermoset resin, reinforcement material, binder and other dispersed ingredients can be collected from the aqueous phase. Typically, a polymeric flocculant opposite in charge to the binder, is employed; however, other means of destabilizing the aqueous phase can be employed which are suitable for the binder. Examples of suitable flocculants include partially hydrolyzed polyacrylamide for cationic systems, and modified cationic polyacrylamide and diallyldiethylammonium chloride for anionic systems.

Additionally, the slurry of the subject invention can include a variety of other ingredients. Minor amounts of from about 10–33 percent by weight of the solids, dry weight basis, of fillers such as silica compounds $CaCO_3$, MgO, $Mg(OH)_2$, $CaSiO_3$ (wollastonite) and mica can be incorporated. Optionally, pigments and dyes can be employed to impart color or opacity. Preservatives can also be added such as UV stabilizers and antioxidants. Other chemical additives such as foaming agents, anti-foaming agents, bacteriocides, electromagnetic radiation absorption agents, etc. can be employed depending on the desired article to be produced.

In particular, the optional addition of low levels of synthetic polymeric fibers or polyolefin pastes or pulp have been found to be advantageous in the preparation of the thermoset composite. For example, polyaramid pulp additives are generally disclosed in French Pat. No. 2507123-A as contributing to the cohesive properties of the composite. Other typical polymeric fibers are polyethylene, polypropylene, polyvinylchloride, polyester, polystyrene and ABS (acrylonitrile-butadiene-styrene copolymer). Preferred polymeric fibers are commercially available from Himont Corporation under the trademark Pulpex E ® for polyethylene fibers and the trademark of Pulpex P ® for polypropylene fibers. Generally, the polymeric fibers are present from about 1 to about 10 preferably from about 3 to about 5 weight percent based on total solids.

Optionally, the ingredients of the aqueous portion of the process can be dispersed in a thickened aqueous medium. A thickened aqueous medium is advantageous for uniformly dispersing the ingredients of the thermoset composite.

Thickeners which can be added to the water are methylcellulose, carboxymethylcellulose, polymers of acrylamides, gum, or clays to name a few. One such group of thickeners is commercially available from Kelco Company under the trademark Kelzan ®, for xanthan gums. Thickened aqueous mediums having a viscosity above 1 centipoise are preferred (as measured by Brookfield LVDT at 12 rpm). More preferable are viscosities from about 1.5 to about 10 centipoises.

EXAMPLE I (a) A thermoset random-fiber thermoset composite was prepared with an epoxy powder. An aqueous slurry was prepared by dispersing 21.4 g of ¼ inch (6.3 mm) glass fibers in 7 liters of water, adding 1.5 g of latex solids comprising 54 styrene/45 butadiene/1 fumaric acid and 50 g of an epoxy powder coating formulation consisting of 70 parts of an epoxy resin having an epoxy equivalent of 500–575, 30 parts of a phenolic resin and 0.2 percent methylimidazole. The slurry was destabilized with a dilute, cationic, aqueou solution containing 0.5 g of Betz ®1260 flocculant (a trademark of the Betz Laboratories, Trevose, Pa., USA for a high molecular weight acrylamide copolymer cationic flocculant). The destabilized slurry was dewatered and the solids collected on an 80-mesh screen in a William Sheet mold.

The wet mat was dried at 50° to 55° C. in a vaccum oven. The dried mat was then molded (0.1×3.5×6 inch) in a matched metal dieset and heated at 200° C. for 15 minutes at approximately 500 psi pressure. The thermoset composite contained 28.6 percent glass fiber by weight and the physical properties were measured and are shown in the Table.

(b) A thermoset sheet was prepared and molded containing no glass fiber. This sheet demonstrates the difference between an unfilled thermoset resin and the random-fiber thermoset composite of the subject invention. The physical properties for the unfilled sheet are shown in the Table.

EXAMPLE II

Preparation of Two-Step Thermoset Composite

A random-fiber thermoset composite was prepared employing a two-step method. The thermoset resin employed was Derakane ®, a trademark of The Dow Chemical Company for vinyl ester type resins.

In the first step, an aqueous dispersion was prepared by dispersing 30 g of milled glass fibers in water with a Derakane ® aqueous dispersion cationically stabilized with a thiodiethanol/lactic acid surfactant (15 g of Derakane ® solids). The Derakane ® aqueous dispersion consisted approximately of 50.7 percent water, 25.7 percent of a diglycidyl ether of bisphenol A having an epoxide equivalent weight of from 178 to 186, 7.2 percent bisphenol A, 6.2 percent carboxyl-terminated butadiene, 4.2 percent methacrylic acid, 3.2 percent thiodiethanol, 2.7 percent lactic acid, 0.05 percent benzyltriethyl phosphonium acetate curing agent, 0.05 percent ethyltriphenol phosphonium acetic acetate catalyst, 0.02 percent hydroquinone and 0.002 percent phenothiazine. The aqueous slurry was destabilized with 30 g of a 25 percent solid, anionic stabilized, aqueous dispersion of a copolymer of ethylene/acrylic acid (25 percent acrylic acid). The slurry was dewatered and the solids collected and dried for 2 hours at 105° C. The dry weight of the mat was 42.6 g with a 65.6 percent glass content by total weight of the mat.

In the second step, 31.5 g of the above-prepared mat was saturated with 30 g of liquid styrene monomer containing 0.3 g of benzoyl peroxide. The saturated mat was then molded (0.1×3.5×6 inch) and heated at 200° C. for 30 minutes and its physical properties measured. The results are listed in the Table.

EXAMPLE III

A random-fiber thermoset composite was prepared as follows. All weights are on a dry basis unless otherwise indicated. An aqueous slurry was prepared in 28 liters of water thickened with 1 g of Kelzan ®XC ( a trademark of the Kelco Company for xanthan gum). To the thickened water was added 8.4 g of a polyolefin fiber of polyethylene and 84 g of 3/16 of an inch glass fibers. To this dispersion was added 14 g of latex binder, 54 styrene/45 butadiene/1 fumaric acid and 173.6 g of a thermoset formulation consisting of equal equivalent portions of an epoxy novalac resin, equivalent weight 180, and a diaminodiphenyl sulfone curing agent. The slurry was destabilized with a dilute, cationic, aqueous solution containing 0.5 g of Betz ®1260 flocculant, dewatered and solids collected into a sheet, and dried at 110° C. for 1.75 hours. Three 0.1×3.5×6 inch moldings were made by preheating the mats for 15 minutes at 110° C. and then molding at 175° C. for 4 minutes at 2 tons ram pressure, 15 minutes at 7 tons ram pressure and then cooled 15 minutes under 7 tons ram pressure. The average physical properties for the molded thermoset mats were measured and are shown in the Table.

EXAMPLE IV

A random-fiber thermoset composite was prepared as follows. All weights are on a dry basis unless otherwise indicated. An aqueous slurry was prepared by dispersing 84 g of 3/16 inch glass fibers and 14 g of a latex binder (54 styrene/45 butadiene/1 fumaric acid) in 28 liters of water thickened with 1 g of Kalzan ®XC To this dispersion was added 182 g of of a 1:1 equivalent weight mixture of an epoxy novalac (equivalent weight 180) and diaminodiphenyl sulfone curing agent. The slurry was destabilized with a dilute, cationic, aqueous solution containing 0.5 g of Betz ®1260 flocculant, dewatered and solids collected into a sheet and dried at 110° C. for 1.75 hours.

A 0.1×3.5×6 inch sample of the mat was molded by preheating the mat for 15 minutes at 110° C. and then molded in a positive pressure mold for 10 minutes at 175° C., 2 tons ram pressure; 15 minutes at 175° C., 7 tons ram pressure; and cooled 15 minutes at 7 tons ram pressure. The physical properties of the molded thermoset composite were measured and are shown in the Table.

EXAMPLE V

A random-fiber thermoset composite was prepared as follows. All weights are on a dry basis unless otherwise indicated. An aqueous slurry was prepared by adding 84 g of 3/16 inch glass fibers and 14 g of a latex binder (54 styrene/45 butadiene/1 fumaric acid) to 28 liters of water thickened with 1 g Kelzan ®XC. To this dispersion was added 182 g of an epoxy novalac (equivalent weight 180) and an epoxy hardener of a 2 mole adduct of bisphenol A (p,p'-isopropylidenediphenyl) per 1 mole of diglycidylether. The slurry was destabilized with a dilute, cationic, aqueous solution containing 0.3 g of Betz ®1260 flocculant, dewatered and solids collected into a mat, and dried at 110° C. for 2.25 hours.

A 0.1×3.5×6 inch sample of the mat was molded by preheating the mat to 110° C. for 15 minutes and then molded in a positive pressure mold for 4.5 minutes at 175° C., 1 ton ram pressure; 15 minutes at 175° C., 7 ton ram pressure; and cooled 15 minutes at 7 ton ram pressure. The physical properties of the molded thermoset composite were measured and are shown in the Table.

EXAMPLE VI

A random-fiber thermoset composite was prepared as follows. All weights are on a dry basis unless otherwise indicated. An aqueous slurry was prepared by adding 84 g of 3/16 inch glass fibers and 14 g of a latex binder (54 styrene/45 butadiene/1 fumaric acid) to 28 liters of water thickened with 1 g Kelzan ®XC. To this dispersion was added 182 g of a phenolic thermoset resin consisting of Durez ® (a trademark of The Occidental Petroleum Company for a phenol/formaldehyde resin). The slurry was destabilized with Betz ®1260 flocculant, dewatered, and solids collected and dried 24 hours at room temperature. The sheet was partially cured by heating the dried sheets for 10 minutes at 110° C. The sheet was then compression molded into 0.1×3.5×6 inch samples. The physical properties of the random-fiber thermoset composite were measured and recorded in the Table.

TABLE

| Example | Tensile (psi) | Modulus (psi) | Elongation (percent) | Notched Izod (ft/lb/in) |
|---|---|---|---|---|
| I(a) | 13,800 | $1.2 \times 10^6$ | 1.8 | — |
| I(b)* | 8,450 | $0.4 \times 10^6$ | 6.2 | — |
| II | 12,690 | $1.9 \times 10^6$ | 0.9 | 1.23 |
| III | 16,400 | $1.1 \times 10^6$ | — | 3.11 |
| IV | 12,100 | $1.2 \times 10^6$ | — | 5.30 |
| V | 10,610 | $1.4 \times 10^6$ | — | 4.40 |
| VI | 17,930 | $1.3 \times 10^6$ | — | 5.18 |

*Not an example of the subject invention.

What is claimed is:

1. A process for preparing a random-fiber thermoset composite comprising the steps of:
   (a) preparing an aqueous slurry comprising
      (i) a reinforcing material,
      (ii) binder, and
      (iii) a thermoset resin formulation comprising a solid thermoset resin(s), a solid thermoset resin and a latent curing agent, or a solid thermoset resin portion of a coreactant thermoset system containing a solid and liquid or gaseous component;
   (b) destabilizing and dewatering said slurry;
   (c) collecting the solids in the form of a mat;
   (d) drying said mat under conditions such that said thermoset formulation remains in a heat formable state, forming said mat into a predetermined shape and, where the thermoset resin formulation is said coreactant thermoset system, saturating said mat with the liquid or gaseous component of said coreactant thermoset system; and
   (e) curing said mat.

2. The process of claim 1 where said slurry is destabilized with a polymeric flocculant opposite in charge to said binder.

3. The process of claim 1 where prior to said curing step (e) said mat is lofted.

4. The process of claim 1 where the thermoset resin formulation in step (a) part (iii) is a coreactant thermoset system wherein said solid component is a vinyl terminated epoxy resin and in step (d) where said liquid component is a vinyl monomer.

5. The process of claim 4 where said vinyl monomer is styrene.

6. The process of claim 1 where said thermoset resin formulation is an epoxy resin and a latent curing agent.

7. The process of claim 6 where said epoxy resin is diglycidylether of bisphenol A.

8. The process of claim 6 where said latent curing agent is a diamine or anhydride.

9. The process of claim 1 where said thermoset resin formulation is a phenolic resin and a latent curing agent.

10. The process of claim 9 where said phenolic resin is a phenol formaldehyde type.

11. The process of claim 9 where said latent curing agent is urea formaldehyde, melamine formaldehyde or polyamines.

12. The process of claim 1 where said solid thermoset resin(s) is an aqueous dispersion.

* * * * *

UNITED STATES PATENT AND TRADEMARK OFFICE
CERTIFICATE OF CORRECTION

PATENT NO. : 4,654,100
DATED : March 31, 1987
INVENTOR(S) : Larry D. Yats and Ritchie A. Wessling It is certified that error appears in the above-identified patent and that said Letters Patent is hereby corrected as shown below:

Column 3, line 26, "two-setp" should read -- two-step --.

Column 4, line 6, "epoxides," should read -- epoxies, --.

Column 5, line 35, "a" should read -- the --; and bridging lines 59 and 60, "polymrization" should read -- polymerization --.

Column 6, line 65, after "equivalent" please insert the word -- weight --; and line 67, "aqueou" should read -- aqueous --.

Signed and Sealed this

Twenty-ninth Day of September, 1987

Attest:

DONALD J. QUIGG

Attesting Officer     Commissioner of Patents and Trademarks